United States Patent [19]

Whalen et al.

[11] Patent Number: 4,627,024
[45] Date of Patent: Dec. 2, 1986

[54] WINDOW-ADDRESSABLE MEMORY CIRCUIT

[75] Inventors: Barry H. Whalen, Rancho Palos Verdes; James G. Peterson, Manhattan Beach, both of Calif.

[73] Assignee: TRW Inc., Redondo Beach, Calif.

[21] Appl. No.: 517,083

[22] Filed: Jul. 21, 1983

[51] Int. Cl.⁴ .............................................. G06F 7/02
[52] U.S. Cl. .................................................. 364/900
[58] Field of Search ... 364/200 MS File, 900 MS File

[56] References Cited

U.S. PATENT DOCUMENTS 3,931,612 1/1976 Stevens et al. ................... 364/900
4,473,081 9/1984 Dioguardi et al. ................ 128/670

Primary Examiner—Thomas M. Heckler
Attorney, Agent, or Firm—Noel F. Heal; Robert M. Wallace

[57] ABSTRACT

A memory circuit in which are stored multiple sets of upper and lower limits that are simultaneously compared with a stream of input data words. The data words and the upper and lower limits may be selectively segmented into data fields or dimensions, and match signals are generated if the input data fields fall within the corresponding fields of the upper and lower limits. The match signals may be selectively masked by a window enable register, and the data fields selected by changing a field length control register.

13 Claims, 6 Drawing Figures

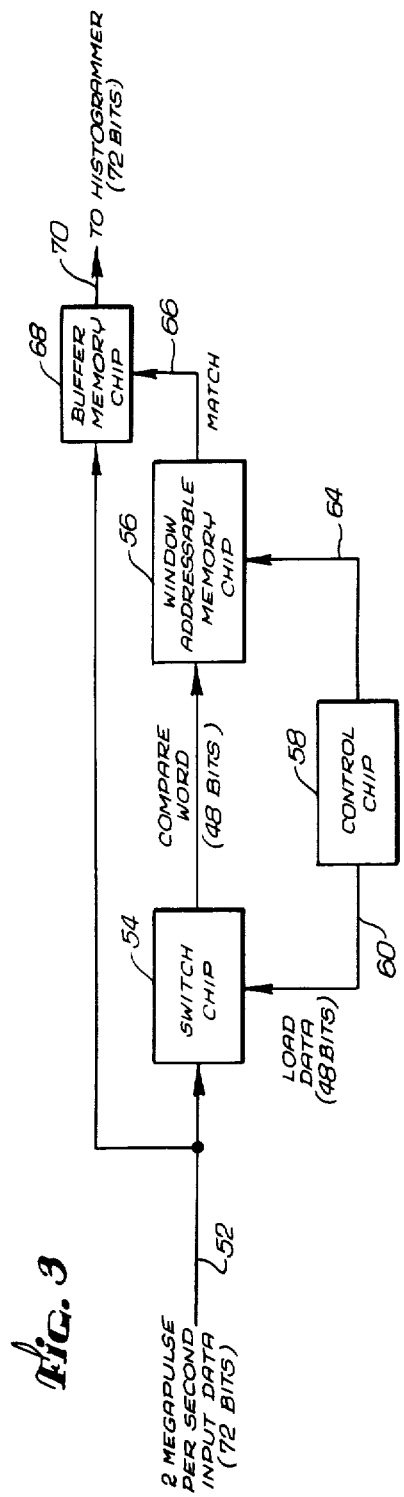
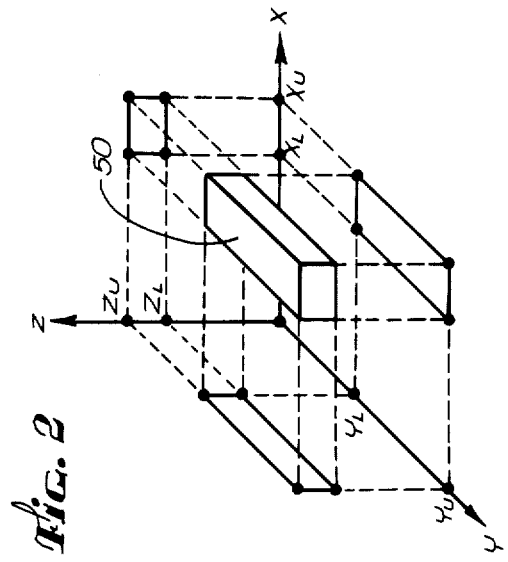
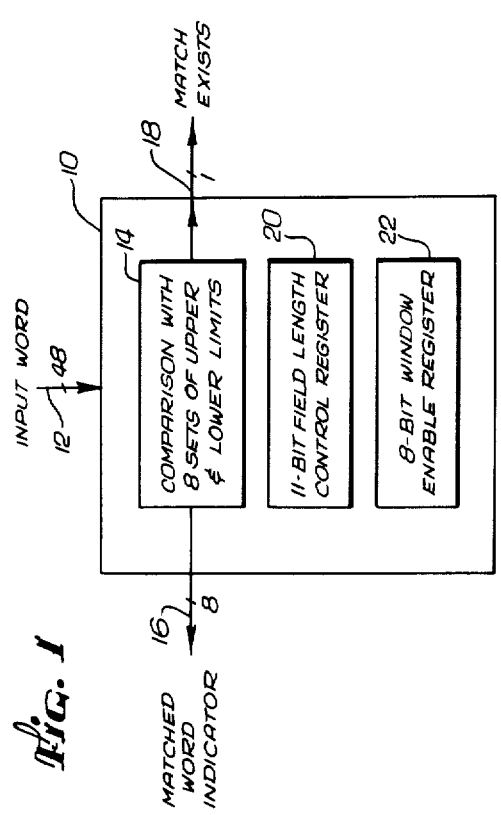

WINDOW-ADDRESSABLE MEMORY CIRCUIT

BACKGROUND OF THE INVENTION

The present invention relates generally to memory circuits, and more particularly, to special purpose memory circuits used in digital signal processing systems. There is a general class of computational problems in which numerical data must be sorted in accordance with its relationship to one or more sets of dimensional limits. It is with this class of problems that the present invention is concerned.

For example, in the processing of census data it may be useful to determine the number of people within specified age limits living within a specified geographical area, as defined by a numerical range of postal ZIP codes. Clearly, such a problem is easily handled by a programmable general-purpose digital computer. The speed of operation of the computer is usually of no concern, since there is typically no need for an immediate solution to the problem. However, there are other problems in the same general class that must be solved more rapidly. In some cases, the solution is required in "real time," or almost instantly as a data stream is received and processed. A programmed digital computer may still be fast enough to satisfy the requirements of some of these applications. For others, however, even the fastest programmable computers cannot provide real-time solutions to the complex signal processing problems that are involved.

One area in which real-time solutions are typically required is the field of pattern recognition and image processing. For example, the processing of photographic data from an earth-orbiting satellite may require that areas having a particular color and a particular shape be identified and counted. Pattern recognition has many well known applications in both military and commercial areas.

Another important example of the type of signal processing with which the invention is concerned is the processing of radar pulses. The analysis of radar pulses from multiple sources is frequently too complex for human operators to be able to handle rapidly and reliably. In a typical system, each received radar signal is preprocessed into digital fields that characterize and completely define the signal. The fields might contain such information as time of arrival, frequency, pulse amplitude, pulse width, angle of arrival, and so forth. In a typical application, there may be many such signals whose sources are known and are of no consequence to the purpose of the signal processing. Since the characteristics of these signals from known sources are also known, a first processing step is usually to filter out these known signals from the ones of more particular interest. This filtering step is analogous to finding the number of people in a selected age group in a particular region of the country, but in the radar example the specified items are discarded rather than further analyzed. Both applications, however, are examples of a processing step that might be described environmental filtering.

In any event, it will be appreciated from the foregoing that there is a significant need for an alternative to using programmed computers for the type of environmental filtering steps that are called for in a large number of signal processing applications. The present invention satisfies this need, as will now be further explained.

SUMMARY OF THE INVENTION

The present invention resides in a memory circuit capable of high speed sorting of items of input data, based on the relationship of the data to stored upper and lower limits in multiple dimensions. The circuit simultaneously compares each input data item with multiple pairs of upper and lower limits, and provides an indication of whether or not the item falls within the limits.

Basically, and in general terms, the window addressable memory circuit of the invention comprises input circuit means, for inputting data words having a plurality of data fields, memory means, for storing a plurality of sets of upper and lower limits, dual comparator means, for simultaneously comparing the stored plurality of upper and lower limits with each input data word, and output circuit means, for indicating whether any of the comparisons made in the dual comparator means resulted in a match.

More specifically, the circuit also includes means for specifying a plurality of fields in the input data words. The comparisons with upper and lower limits are performed on the fields separately, but practically at the same time, and there has to be a match in all fields in order to produce a match signal for that particular set of limits. In other words, the input data item must fall between the specified limits for all fields or dimensions of the data item. A plurality of such comparisons is performed simultaneously for different sets of upper and lower limits, and the output provided comprises a plurality of match signals, one for each set of upper and lower limits in use, and a composite match signal indicating whether there was a match for any one or more of the sets of limits.

The circuit of the invention also includes means for selecting the field lengths within the input data words, and means for selectively enabling and disabling the individual "windows" of upper and lower limits. Also included are means for loading and unloading the memory means with upper and lower limit data, and means for segmenting the input data words so that less than a full-length word may be optionally input.

The circuit is intended for implementation in monolithic form, although is not necessarily limited to this form. In the embodiment disclosed, the memory means holds as many as eight sets of upper and lower limits, but multiple circuits can be cascaded to allow for the use of multiples of eight windows to be simultaneously applied to the same data.

It will be appreciated from the foregoing that the present invention represents a significant advance in the field of digital signal processing. In partieular, the invention provides a high speed circuit for sorting data in accordance with the relationship between multiple fields or dimensions of the data and corresponding multiple sets of upper and lower limits. Other aspects and advantages of the invention will become apparent from the following more detailed description, taken in conjunction with the accompanying drawings.

BRIEF DESCRIPTION OF THE DRAWINGS

FIG. 1 is a simplified block diagram showing the broad functions of a window-addressable memory circuit in accordance with the present invention;

FIG. 2 is an isometric graphical representation showing an example of an application of the window-addressable memory circuit;

FIG. 3 is a simplified block diagram showing another application of the window-addressable memory circuit, in the sorting of radar pulses;

DESCRIPTION OF THE PREFERRED EMBODIMENT

Figure 4:
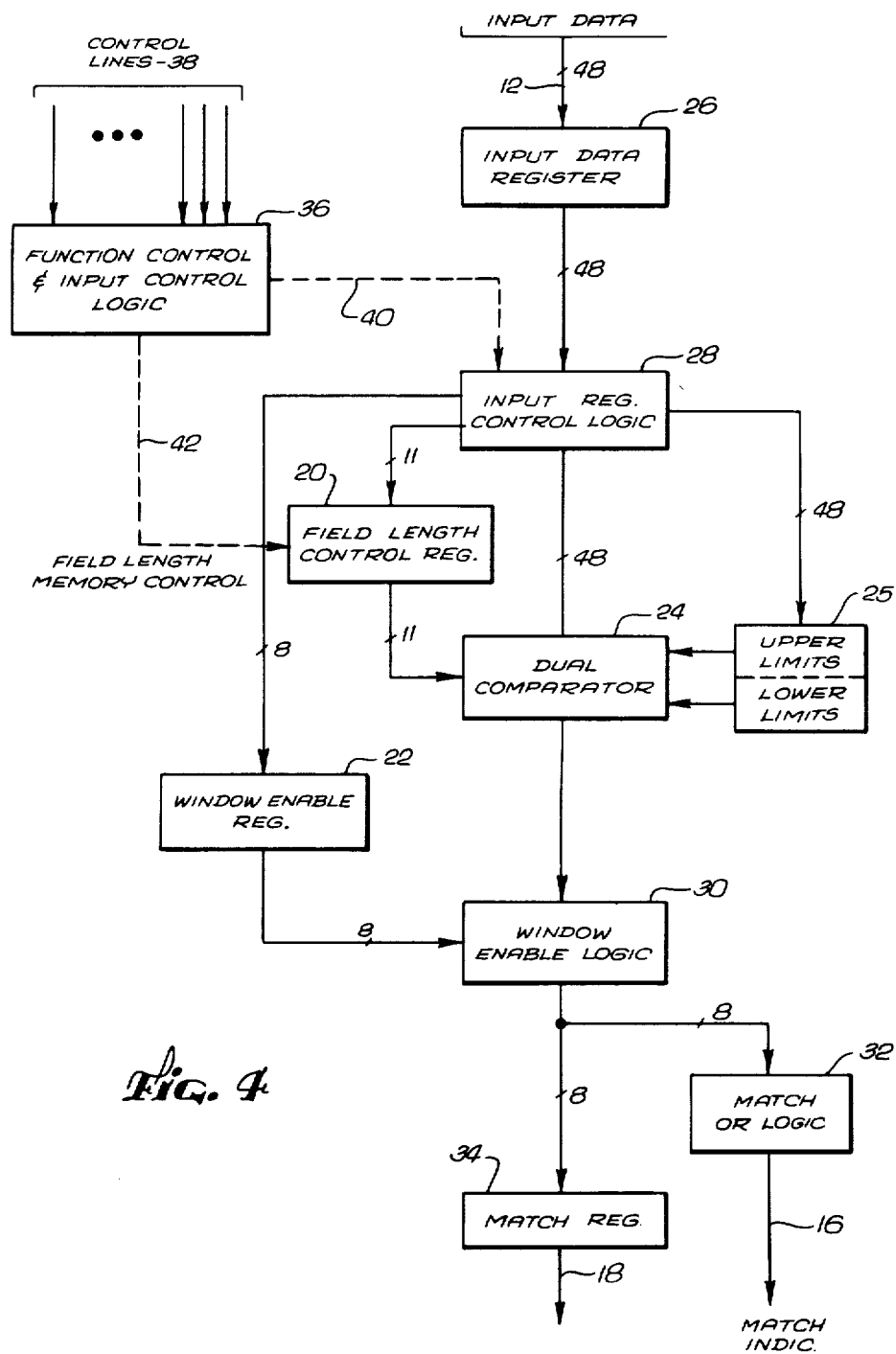
FIG. 4 is a block diagram showing the principal components of the window-addressable memory circuit.

As shown in the drawings for purposes of illustration, the present invention is concerned with digital memory circuits used in the processing of statistical and other data. It is often desired to sort or filter data in relation to windows of upper and lower limits in multiple dimensions. Although this sorting process can be performed in a digital computer, the computer processing time may be too great for some applications in which a real-time response is needed.

In accordance with the invention, such data can be compared simultaneously with multiple sets of upper and lower limits, in a special-purpose circuit that can perform the comparisons at very high speed. In some applications, the data falling within the prescribed window limits in all dimensions will be retained for further processing. In other applications, the data falling within the prescribed window limits will be discarded, while the remaining data will be retained for further processing.

FIG. 1 shows the basic function of the window-addressable memory circuit, which is indicated by reference numeral 10. As indicated at 12, the circuit receives a sequence of 48-bit input words. It will be understood, of course, that the size of the input word is not a limiting factor. As indicated in block 14, each input word is compared with up to eight sets of upper and lower limits stored in the circuit. Match signals are provided on eight output lines 16, to indicate whether the input word fell within the eight sets of upper and lower limits. A single composite match signal is also provided, on line 18, to indicate whether a match occurred for any of the eight sets of limits.

As will be discussed in more detail, the circuit 10 also includes a field-length control register 20, and a window enable register 22. The field-length control register 20 defines how the 48-bit data word is divided into logical fields of data. In the illustrative embodiment, there may be as many as twelve fields of four bits each, or a smaller number of fields having multiples of four bits each. The field-length control register 20 defines the field boundaries within the data word and within the corresponding upper and lower limits.

FIG. 4 shows the window-addressable memory (WAM) circuit in more detail. The principal components are a dual comparator 24, a random access memory 25 for the storage of sets of upper and lower limits, input data registers 26, input register control logic 28, window enable logic 30, match OR logic 32, a match register 34, and function control and input control logic 36.

Data is input over the lines 12 to the input register 26, and is input to the dual comparator 24 through the input register control logic 28, which also functions to transmit upper and lower limit data to the memory 25, and to transmit new data to the field length control register 20 and the window enable register 22. Selection of the circuit's various functions is effected by means of a plurality of control lines 38, to be described in detail, and the function control and input control logic 36, as indicated by the broken lines 40 and 42.

When the circuit 10 is instructed to perform a comparison on an item of input data, the dual comparator 24 compares the input data word with each set of upper and lower limits. If any field of the data word does not fall within the upper and lower limits of that field, no match is found as a result of the comparison. The function of the field-length control register 20 is to define the fields of the data word. Each bit of the field-length control register corresponds to a boundary between two adjacent four-bit segments of the data word. If the register bit is a one, this indicates a continuation of a data field from one four-bit segment to the next. If the register bit is a zero, this indicates a data field boundary. The bit position to the right of the boundary is treated as the most significant bit of its data field, and the bit to the left of the boundary is treated as the least significant bit of the next data field.

The window enable register 22 is a mask register that permits a user of the circuit to examine or ignore the results of each of the eight window comparisons. The window enable logic 30 is basically a plurality of AND gates. One input of each AND gate is derived from the match outputs, and the other is derived from the window enable register.

The dual comparator 24 is constructed in the presently preferred embodiment of the invention as a plurality of pairs of subtractor circuits, each of which has as one input the input data word. The other inputs of each pair of subtractor circuits are the upper and lower limits, respectively, of a set of window data taken from the memory 25. An appropriate signal from one subtractor of a pair of such circuits indicates that the data is less than or equal to the upper limit, and a signal from the other subtractor in the pair indicates that the data is greater than or equal to the lower limit. The two signals are ANDed together to produce a match signal for that particular window. The same function is performed simultaneously for the other seven windows, and the eight match signals are next presented to the window enable logic 30, and then to the match register 34. The data fields in the input words are variable, and may be redefined by changing the field-length control register 20. As has been described, the effect of the register 20 is to treat certain designated bits of the data word and the upper and lower limit words as though they were the most significant bits of a field. In operation of the the comparator 24, the result of a subtraction is positive only if the subtraction of each of the separate fields yields a positive result. In other words, if one field is out of limits, the entire data word is said to be out of limits.

Now that the function of the WAM circuit has been described in some detail, the application of the circuit can be better understood. FIG. 2 shows in graphical form the application of the circuit to the processing of data relating to coordinates in three spatial dimensions, X, Y and Z. The upper and lower limits in the X direction are $X_U$ and $X_L$, respectively, while those in the Y and Z directions are $Y_U$, $Y_L$, $Z_U$, and $Z_L$. If the input data consists of sets of threedimensional coordinates, a match signal will be obtained on all three bits of line 18, corresponding to the three spatial dimensions only for coordinate sets falling inside the rectangular box indicated at 50 in FIG. 2. These coordinates may be either discarded or further processed, depending on the requirements of the particular problem. It will be understood, of course, that the WAM circuit is not limited to the processing of data in the form of spatial dimensions. The "dimensional" properties of the data may be representative of physical variables, such as frequency, direction, amplitude, or time; demographic variables such as age, geographical area, religion, occupation, or income; or any other types of variables.

FIG. 3 illustrates another application of the WAM circuit, for the sorting of radar signal pulses in accordance with their physical characteristics. In the illustrative problem, data is being received over line 52 at a very high rate, such as two megapulses per second. Each pulse is initially processed into digital form and is defined by a total of 72 bits of data, of which 24 bits are used to store the time of arrival of the pulse. The remaining 48 bits completely characterize the pulse, and therefore its source. In the illustrative application, it is desired to focus attention on those pulses whose characteristics are not known in advance. There will be some pulses in the stream that are derived from known sources, and the processing of which may not be important to the problem. Accordingly, it is desired to eliminate those known pulses as identified by their characteristics or "dimensions," a task for which the WAM circuit is extremely well suited.

The inputs on line 52 are passed through a switch chip 54, which functions as a multiplexer, and thence to a WAM chip 56 for processing in the manner described above. In this example, the 48 bits of data is divided into a total of six fields, including the band, frequency, pulse amplitude, pulse width, angle of arrival, and a set of flag bits. Operation of the WAM chip 56 and the switch chip 54 is directed by a control chip 58, which is responsible for storing in the WAM chip 56 upper and lower limits relating to known radar sources. The upper and lower limits are transmitted over line 60 to the switch chip 54, and thence to the WAM chip 56. At the same time, control signals are transmitted over line 64 to the WAM chip 56, to instruct it to receive and store limit data rather than data to be compared. When a match signal is generated on line 66, a match has been found with respect to one of the windows of limits. The signal on line 66 is used to inhibit the storing of information relating to the currently processed pulse in a buffer memory chip 68, to which the input data on line 52 is also connected. Thus, the output from the buffer memory chip 68, on line 70, represents only the pulses whose characteristics did not fit any of the plurality of stored limits in the WAM chip 56. The information on line 70 can then be subject to further processing, such as counting in a histogrammer circuit (not shown). The WAM chip 56 performs a very high speed filtering step on the incoming data in real time, something that could not be achieved using conventional processing methods without a significant sacrifice in the speed of response.

Figure 5:
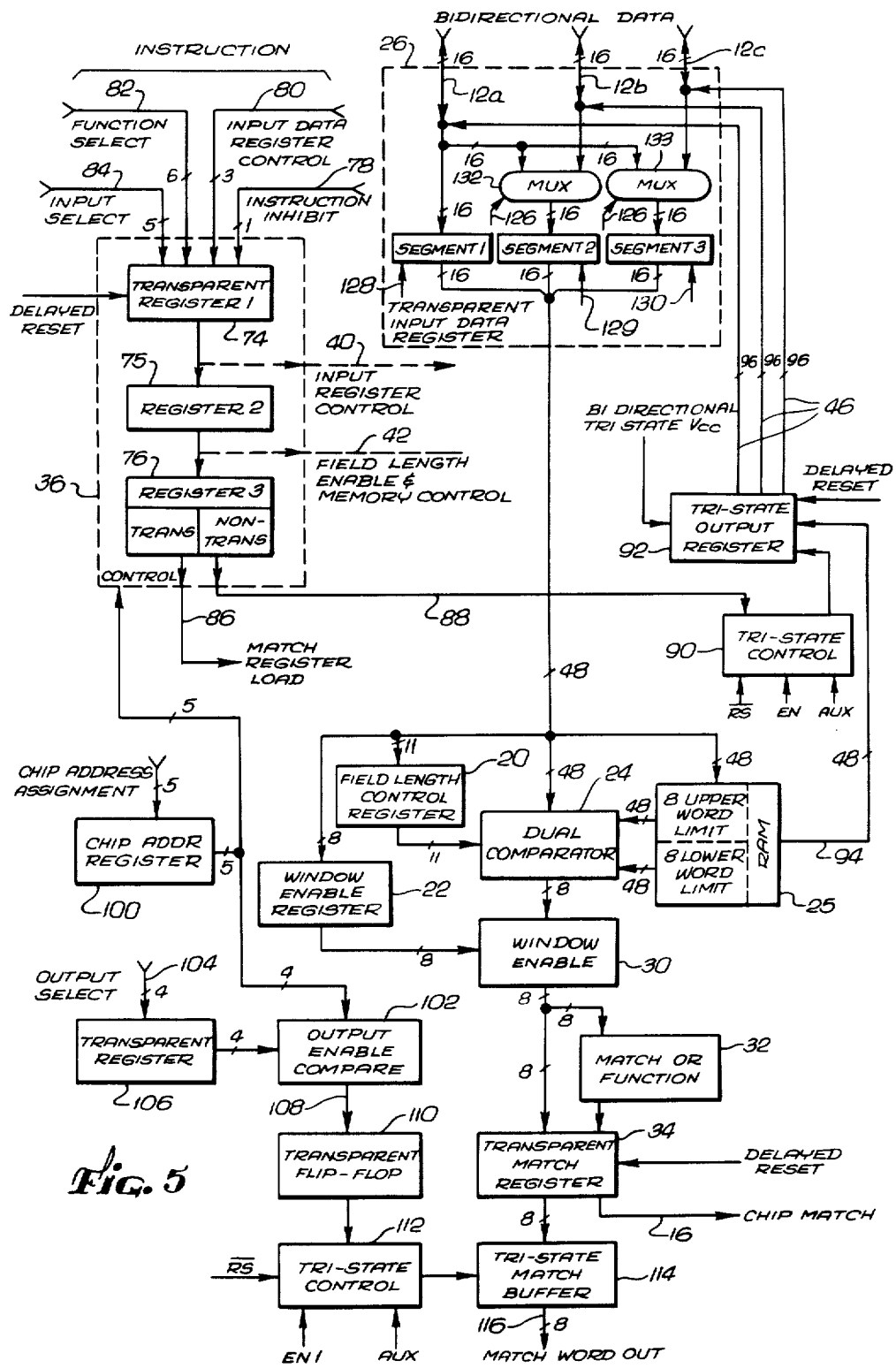
FIG. 5 is a block diagram similar to FIG. 4, but showing additional components of the window-addressable memory circuit.

FIG. 5 is a block diagram of the entire WAM circuit, including more than the principal components shown in FIG. 4. The function control and input control logic 36 includes three registers 74, 75 and 76, the function of which will be further explained in relation to FIG. 6. The control lines 38 include a single instruction inhibit (II) line 78, three input data register control lines 80, six function select lines 82, and five input select lines 84, all of which are input to the first register 74. The control logic 36 functions as a timing sequencer, producing control signals on line 40 to control the input register 26, on line 42 to control loading of the field length control register 20 and the window enable register 22, and on line 86 to control loading of the match register 34.

In addition, the control logic 36 generates a control signal on line 88 to tri-state control logic 90. The latter controls a 48-bit tri-state output register 92, which receives inputs over lines 94 from the memory, and provides outputs over lines 96 to the data input lines 12. The data input lines are shown as divided into three segments of sixteen bits each. The tri-state output register 92 provides an output path from the memory 25, permitting a user of the circuit to read the upper and lower stored in the memory. Tri-state register devices are widely used in digital circuit design where external connections to a circuit are to serve two or more separate purposes, such as input and output, at different times. For example, the tri-state output register 92 presents a high impedance to the input lines 12 when input data is impressed on the input lines, but presents a relatively low-impedance path when output data is being transferred from the memory 25 to the input lines 12a, 12b and 12c.

Another use of tri-state devices is made in handling the match signal outputs from the match register 34. When a number of the WAM circuits are cascaded together to obtain a larger number of windows with which the input data is compared, the user has the option of addressing each of the circuits separately to determine whether a match has been found. For this purpose, each circuit may be assigned a chip address, as stored in a chip address register 100. An output enable compare circuit 102 compares this local chip address with a chip address selected by means of a set of output selection lines 104, which are coupled to a register 106 and thence to the output enable compare circuit. If a match is found in the comparison of output chip addresses, a match signal is transmitted over line 108 to a transparent flip-flop 110, and thence to a tri-state control circuit 112, which controls a tri-state match buffer 114. The match buffer 114 is coupled to receive the contents of the match register 34, and when appropriately instructed by the tri-state control circuit 112, to couple the contents of the match register out onto output lines 116. Thus, the circuit has to be properly addressed by the output select signals on lines 104 before the tri-state buffer 114 will couple the match signals onto the output lines 116.

The two tri-state control circuits 90 and 112 include as inputs a reset signal designated RS/ (shown in the drawing as $\overline{RS}$), an enable signal line EN1 and an auxiliary control line AUX. The EN1 and AUX signals are used only in a special maintenance mode of operation, which does not relate to the invention. The reset signal RS/ forces the tri-state outputs to a high impedance and generates a delayed reset signal, which is applied to the window enable register 22, to the control register 74 in the control circuitry 36, to the match register 34, and to the tri-state output register 92.

Register 74, part of register 76, output select register 106, flip-flop 110, and the match register 34, are all designated as transparent registers in FIG. 5. This aspect of the circuit design is of no direct consequence to the invention, but rather relates to detailed timing considerations important to users of the circuit. These registers are transparent in a timing sense, since they interpose practically no timing delay between their inputs and outputs. In the preferred embodiment of the invention, each of the five transparent registers may be selectively rendered non-transparent by separate control signals (not shown), available to the user of the circuits. This transparency control may be desirable in certain applications of the WAM circuit. Basically, register transparency control is an operational option that is closely related to the specific application of the circuit.

Figure 6:
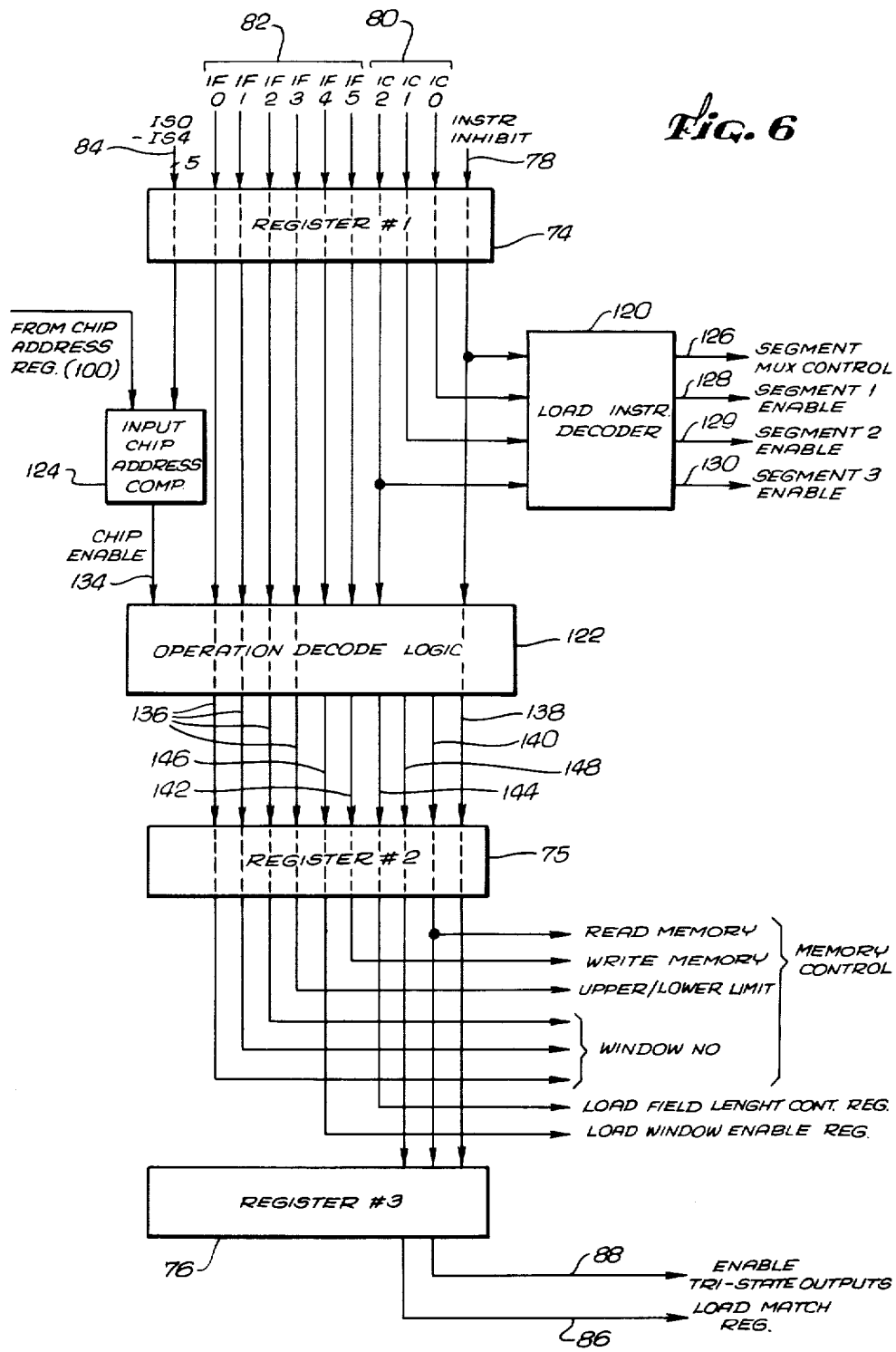
FIG. 6 is a logic diagram showing details of the control logic employed in the window-addressable memory circuit.

It only remains to discuss the function control and input control logic 36 (FIG. 4) in more detail, with reference to FIG. 6. Control lines 80, 82 and 84, and the instruction inhibit line 78 together provide inputs to register 76, also referred to as control register #1. The outputs from register 74 are variously coupled to a load instruction decoder 120, to operation decode logic 122, and to an input address comparator 124. The input register control signals derived from the control lines 80, designated IC0, IC1 and IC2, are directed to the load instruction decoder 120, together with the instruction inhibit signal (II), and the decoder generates a segment MUX control signal on line 126 and three segment enable signals on lines 128, 129 and 130. The meanings of the various combinations of input instruction codes is given below in TABLE I.

TABLE I

| Function | IC2 | IC1 | IC0 |
| --- | --- | --- | --- |
| Load all segments and process | 1 | 0 | 0 |
| Load segment 1 and process | 1 | 0 | 1 |
| Load segment 2 and process | 1 | 1 | 0 |
| Load segment 3 and process | 1 | 1 | 1 |
| No operation (NOP) | 0 | 0 | 0 |
| Load segment 1 and internal NOP | 0 | 0 | 1 |
| Load segment 2 and internal NOP | 0 | 1 | 0 |
| Load segment 3 and internal NOP | 0 | 1 | 1 |

The logical details of the load instruction decoder 120 will be apparent from the functions set forth in Table I but will be described in full for the sake of completeness. First, the segment MUX control signal on line 126 is derived directly from the IC1 control signal, since it will be noted that IC1 is a logical "1" only when segment #2 or segment #3 is being loaded separately. To load segment #1 separately, the input data is applied to the sixteen input lines 12a (FIG. 5) for segment #1. For input to segment #2 only, or segment #3 only, the data is also applied to the segment #1 input lines 12a, but the data must be directed to the appropriate input register segment. This is done by means of two multiplexers 132 and 133, which are normally switched to transmit data from input lines 12b and 12c, respectively, to the corresponding input register stages. When a logical "1" control signal is applied to the multiplexers, over line 126 from the load instruction decoder 120, the multiplexers are switched to accept data from the segment #1 input lines 12a.

The logical equations for generation of the segment enable control signals S1EN, S2EN and S3EN are as follows:

$S1EN = FAND1 + FAND2;$ $S2EN = FAND1 + FAND3;$ and $S3EN = FAND1 + FAND4;$ where $FAND1 = (II/).(IC2).(IC1/).(IC0/);$ $FAND2 = (II/).(IC1/).(IC0);$ $FAND3 = (II/).(IC1/).(IC0/);$ and $FAND4 = (II/).(IC1).(IC0).$ The slash (/) indicates the inverted or "not" form of the signal, the dot (.) indicates a logical AND function and the plug sign (+) indicates a logical OR function.

The input selection control lines 84 are transmitted through the first register 74 to the input chip address comparator 124, which serves the same function for input as the address comparator 102 (FIG. 5) serves for output. If the address coded on the input selection lines 84 matches the address in the chip address register 100, a chip enable signal is generated on line 134 from the input chip comparator 124 to the operation decode logic 122.

The operation decode logic 122 receives as inputs the six function selection lines 82, designated IF0 through IF5, together with the chip enable line 134, the instruction inhibit line 78, and the input selection line 80 designated IC2. The operation decode logic 122 generates control signal outputs in accordance with the functions set forth in TABLE II below.

TABLE II

| Function | IF5 | IF4 | IF3 | IF2 | IF1 | IF0 |
| --- | --- | --- | --- | --- | --- | --- |
| Load upper limit for window N of selected chip | X | 1 | 1 | A2 | A1 | A0 |
| Load lower limit for window N of selected chip | X | 1 | 0 | A2 | A1 | A0 |
| Read upper limit for window N of selected chip | 1 | 0 | 1 | A2 | A1 | A0 |
| Read lower limit for window N of selected chip | 1 | 0 | 0 | A2 | A1 | A0 |
| Load upper limit for window N of any chip | 0 | 1 | 1 | A2 | A1 | A0 |
| Load lower limit for window N of any chip | 0 | 1 | 0 | A2 | A1 | A0 |
| Load field length control register of selected chip | 0 | 0 | X | 0 | 1 | 0 |
| Load field length control register of any chip | 0 | 0 | 0 | 0 | 1 | 0 |
| Load window enable control register of selected chip | 0 | 0 | X | 0 | 0 | 1 |
| Load window enable control register of any chip | 0 | 0 | 0 | 0 | 0 | 1 |
| Compare data (load into match reg.) on selected chip | 0 | 0 | X | 0 | 1 | 1 |
| Compare data (load into match | 0 | 0 | 0 | 0 | 1 | 1 |

TABLE II-continued

| Function | IF5 | IF4 | IF3 | IF2 | IF1 | IF0 |
|---|---|---|---|---|---|---|
| reg.) on any chip Internal no-operation (NOP) | 0 | 0 | 0 | 0 | 0 | 0 |

The operation decode logic 122 generates ten output signals for transmission to control register #2 (75), including four lines 136 that are derived directly from function control lines IF0-IF3, and one line 138 that is derived directly from the instruction inhibit line 78. The other five outputs of the operation decode logic 122 are a read memory line 140 (READEN), a write memory line 142 (WRITEN), a field length load line 144 (FLTHLD), a window enable load line 146 (WENLD), and a compare line 148 (COMPAR). After all of these signals have been passed through the second register 75, they are used as control signals in the following manner. The memory control signals are the read memory line 140 and the write memory line 142 to convey the memory function to be performed, and lines 136 to convey the memory address. The line derived from function input IF3 indicates whether a memory address containing an upper limit or a lower limit is to be addressed, and the lines derived from IF0-IF2 indicate the window number (0 through 7) being addressed. Loading of the field length control register 20 is initiated by means of a signal on control line 144, and loading of the window enable register is initiated by means of a signal on control line 14.

Two remaining control signals are derived from register #2. The compare signal on line 148 is transmitted to register #3 (76), from which is output an enabling signal on line 86, to load the match register 34. Finally, the read memory signal on line 140 and the instruction inhibit line 138 are also transmitted to register 76, from which is generated the signal on line 88 to enable the tri-state outputs to allow reading of data from the memory onto the input lines 12.

The detailed logic necessary to perform these described functions is defined by the logic equations are below.

$READEN = (II/).(IC2).(IF4/).(IF5).(AOREN);$ $WRITEN = (WRTAND).(WRTOR);$ $WRTAND = (II/).(IC2).(IF4);$ $WRTOR = (ADREN) + (IF5/);$ $OTHR = (OTHRAND).(OTHROR);$ $OTHRAND = (II/).(IC2).(IF2/).(IF4/).(IF5/);$ $OTHROR = (ADREN) + (IF3/);$ $FLTHLD = (OTHR).(IF0/).(IF1);$ $COMPAR = (OTHR).(IF0).(IF1);$ $WENLD = (OTHR).(IF0).(IF1/).$

ADREN is the address enable signal supplied on line 134. WRTAND, WRTOR, OTHR, OTHRAND, and OTHROR are intermediate signals used as set forth in the logic equations.

It will be appreciated from the foregoing that the present invention represents a significant advance in the field of memory circuits used in certain types of signal processing systems. In particular, the invention provides a high speed circuit for filtering data in relation to prescribed windows of upper and lower limits. The data may include a plurality of fields or dimensions, and the comparisons are simultaneously performed for a plurality of limit windows. It will also be appreciated that, although a specific embodiment of the invention has been described in detail for purposes of illustration, various modifications may be made without departing from the spirit and scope of the invention. Accordingly, the invention is not to be limited except as by the appended claims.

We claim:

1. A window-addressable memory circuit, comprising:
   input circuit means, including an input register, for inputting into the input register successive data words having a plurality of data fields;
   memory means, for storing a plurality of sets of upper and lower limits;
   dual comparator means, for simultaneously comparing the stored plurality of sets of upper and lower limits with each input data word; and
   output circuit means, for indicating whether any of the comparisons made in said dual comparator means resulted in a match, and wherein said output circuit means includes
   a multi-bit match register having one bit corresponding to each of the plurality of sets of upper and lower limits, and
   a single output line derived as a logical combination of the multiple bits of said multi-bit register.

2. A window-addressable memory circuit as set forth in claim 1, wherein said output circuit means further includes:
   a window enable register having the same number of bits as said match register;
   window enable logic for logically combining the contents of said window enable register with the output of said dual comparator means, and transmitting the result to said match register, whereby only selected bits of output from said dual comparator means are coupled to said match register; and
   means for selectively loading said window enable register.

3. A window-addressable memory circuit as set forth in claim 2, and further comprising:
   a field length control register coupled to said dual comparator means, for defining the lengths of data fields in the input data words and in the sets of upper and lower limits; and
   means for loading new externally supplied field length control information into said field length control register.

4. A window-addressable memory circuit as set forth in claim 3, and further including:
   means for writing into and reading from said memory means.

5. A window-addressable memory circuit as set forth in claim 4, wherein said means for writing into and reading from said memory means employs said input circuit means for this purpose.

6. A window-addressable memory circuit as set forth in claim 5, wherein said input circuit means includes means for inputting only a segment of a full data word at a time.

7. A window-addressable memory circuit, comprising:

input circuit means, including an input register, for inputting into the input register successive data words having a plurality of data fields;

memory means, for storing a plurality of sets of upper and lower limits;

dual comparator means, for simultaneously comparing the stored plurality of sets of upper and lower limits with each input data word;

output circuit means, for indicating whether any of the comparisons made in said dual comparator means resulted in a match;

a field length control register coupled to said dual comparator means, for defining the lengths of data fields in the input data words and in the sets of upper and lower limits; and means for loading new externally supplied field length control information into said field length control register.

8. A window-addressable memory circuit, comprising:

input circuit means, including an input register, for inputting into the input register successive data words having a plurality of sets of data fields;

memory means, for storing a plurality of sets of upper and lower limits;

dual comparator means, for simultaneously comparing the stored plurality of upper and lower limits with each input data word; and output circuit means, for indicating whether any of the comparisons made in said dual comparator means resulted in a match, and wherein said output circuit means includes a multi-bit match register having one bit corresponding to each of the plurality of sets of upper and lower limits, a window enable register having the same number of bits as said match register, window enable logic for logically combining the contents of said window enable register with the output of said dual comparator means, and transmitting the result to said match register, whereby only selected bits of output from said dual comparator means are coupled to said match register, and means for selectively loading said window enable register.

9. A window-addressable memory circuit, comprising:

an input circuit, including an input register, for inputting into the input register successive data words having a plurality (N) of data fields;

a random access memory, for storing a plurality (M) of sets of upper and lower limits;

a dual comparator for simultaneously comparing the stored plurality of sets of upper and lower limits with each input data word and producing a plurality (M) of output match signals;

a field control register coupled to said dual comparator, for defining, for said comparator, the positions of the most significant bits in the N data fields in the data words and the upper and lower limits;

a window enable register having a plurality (M) of stages connected to process the M output match signals from said dual comparator, for selectively enabling the results of the comparisons made in said dual comparator;

a match register, for registering the results of the comparisons made in said dual comparator and selectively enabled in said window enable register; and control means for controlling operations of said input circuit, including said input register, and for controlling operations of said dual comparator through said field control register and said window enable register.

10. A window-addressable memory circuit as set forth in claim 19, wherein:

said input circuit is used for inputting upper and lower limits to said random access memory, and for inputting new information into said field length control register and said window enable register; and said control means includes means for selecting which input operation is performed by said input circuit.

11. A window-addressable memory circuit as set forth in claim 10, wherein:

said input circuit is also used for reading upper and lower limits from said random access memory; and said control means includes means for selecting an output operation in said random access memory.

12. A window-addressable memory circuit as set forth in claim 9, wherein:

said input circuit is also used for reading upper and lower limits from said random access memory; and said control means includes means for selecting an output operation in said random access memory.

13. A window-addressable memory circuit as set forth in claim 9, and further including:

tri-state buffer means coupled to said match register;

circuit address comparison means, for comparing a predefined circuit address with a circuit address supplied over control lines to said window-addressable memory circuit; and means for controlling said tri-state buffer means to permit output of the contents of said match register when said circuit address comparison means finds a match, whereby cascading of multiple window-addressable memory circuits is facilitated.

* * * * *